United States Patent
Armstrong et al.

(10) Patent No.: US 10,681,233 B1
(45) Date of Patent: Jun. 9, 2020

(54) VISUAL WORK IMAGING SYSTEM

(71) Applicants: Walter N. Armstrong, San Antonio, TX (US); Evan Gray, San Antonio, TX (US); Joshua Stowers, San Antonio, TX (US); Oliver Garcia, San Antonio, TX (US); Alex Villareal, San Antonio, TX (US)

(72) Inventors: Walter N. Armstrong, San Antonio, TX (US); Evan Gray, San Antonio, TX (US); Joshua Stowers, San Antonio, TX (US); Oliver Garcia, San Antonio, TX (US); Alex Villareal, San Antonio, TX (US)

( * ) Notice: Subject to any disclaimer, the term of this patent is extended or adjusted under 35 U.S.C. 154(b) by 0 days.

(21) Appl. No.: 15/985,319

(22) Filed: May 21, 2018

Related U.S. Application Data

(60) Provisional application No. 62/508,659, filed on May 19, 2017.

(51) Int. Cl.
*H04N 1/00* (2006.01)
*H04N 1/387* (2006.01)

(52) U.S. Cl.
CPC ..... *H04N 1/00559* (2013.01); *H04N 1/00039* (2013.01); *H04N 1/00045* (2013.01); *H04N 1/00087* (2013.01); *H04N 1/00244* (2013.01); *H04N 1/3876* (2013.01); *H04N 2201/0084* (2013.01)

(58) Field of Classification Search
CPC ........... H04N 1/00559; H04N 1/00045; H04N 1/00087; H04N 1/00039; H04N 1/3876; H04N 1/00244; H04N 2201/0084
USPC ........................................................ 358/406
See application file for complete search history.

(56) References Cited

U.S. PATENT DOCUMENTS

| | | | |
|---|---|---|---|
| 5,615,854 A | 4/1997 | Nomura et al. | |
| 9,473,665 B1* | 10/2016 | Fu | H04N 1/00347 |
| 2004/0182935 A1* | 9/2004 | Russell | H04N 1/00347 235/472.01 |
| 2010/0058174 A1* | 3/2010 | Yamamoto | B42F 5/00 715/243 |

* cited by examiner

*Primary Examiner* — Saeid Ebrahimi Dehkordy
(74) *Attorney, Agent, or Firm* — Jackson Walker LLP

(57) ABSTRACT

Imaging systems for visual works may be by implemented by a variety of systems, processes, and techniques. In one general implementation, an imaging system for a visual work may include side supports support configured to engage a support surface and support the imaging system thereon. The side supports may include tracks along their longitudinal axes. The system may also include a cross member configured to span between the side supports and engage their tracks. The system may also include a carriage adapted to move along a track of the cross member. The carriage may include a camera mount configured to receive, secure, and position a camera above the visual work to be imaged so that the camera images only a portion of the visual work at a time. The carriage may be moved to successive image acquisition locations at which an acquired image overlaps with the previous image.

16 Claims, 6 Drawing Sheets

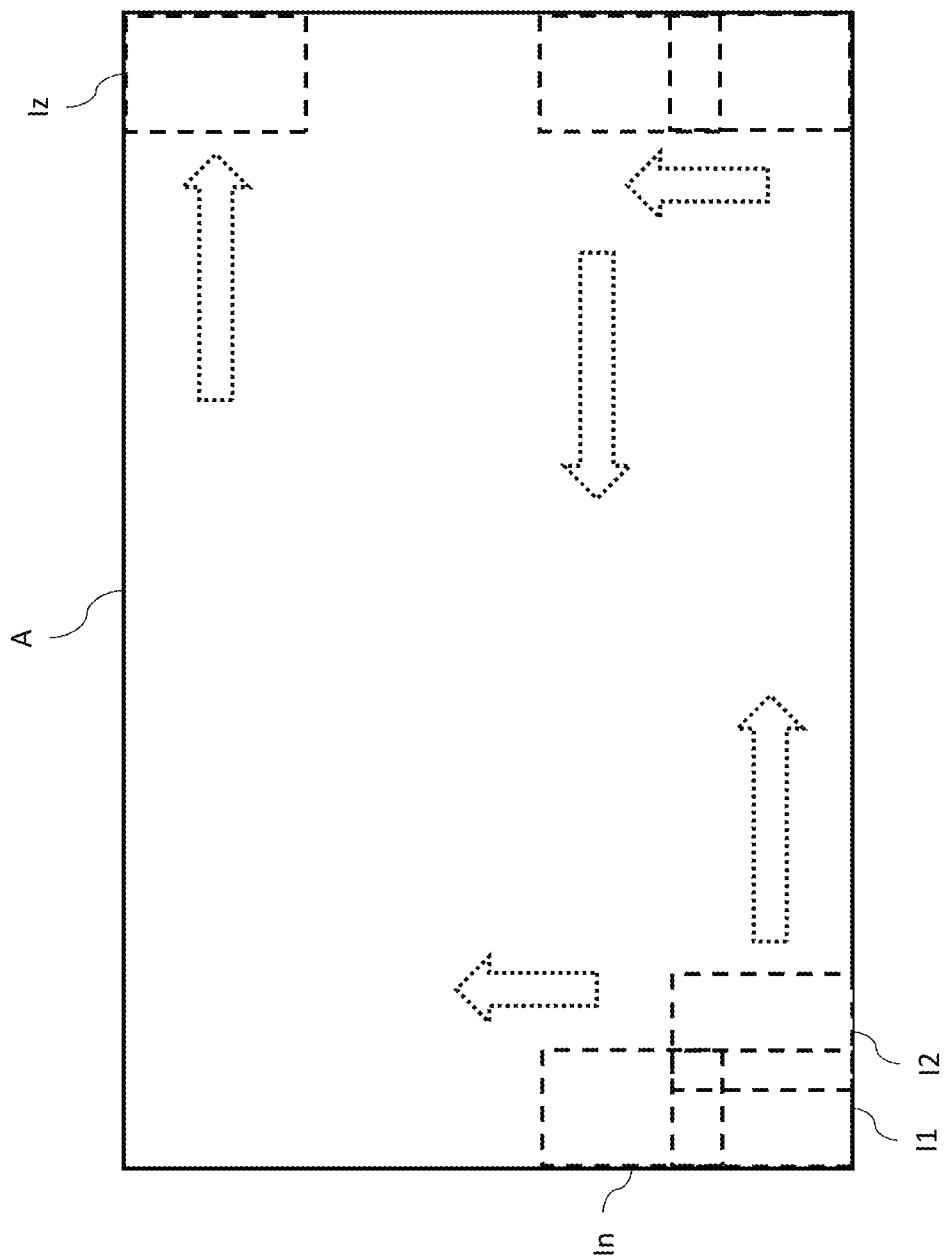

VISUAL WORK IMAGING SYSTEM

RELATED APPLICATIONS

This application claims priority to U.S. Patent Application No. 62/508,659, entitled "Artwork Imaging System" and filed May 19, 2017. This prior application is herein incorporated by reference in its entirety.

TECHNICAL FIELD

This invention relates in general to imaging, and more particularly to systems, processes, and techniques for imaging visual works (e.g., art and manuscripts).

BACKGROUND

Artworks (e.g., paintings, sketches, etchings, etc.) are typically imaged by having a professional photographer photograph the artwork while it hangs on a wall (e.g., in a gallery). The photographer will usually bring in special lights (e.g., reflective umbrellas) and take a single, comprehensive photograph of the entire artwork.

SUMMARY

The systems, processes, and techniques described herein allow for efficient and effective imaging of visual works (e.g., paintings and manuscripts). In particular, the systems, processes, and techniques allow a series of detailed images to be taken of a visual work and then combined together to make a single, detailed image of the whole visual work.

In particular implementations, a visual work imaging system may include a first and a second side support configured to engage a structure and support the imaging system. The system may also include a cross member configured to span between the first and second side supports and engage the side supports to move along their longitudinal axes, the cross member including one or more tracks along its longitudinal axis. A carriage may be configured to move along the one or more tracks of the cross member and include a camera mount configured to receive and secure a smart camera (e.g., an iPhone).

In operation, the camera may be positioned above the visual work to be imaged so that the camera images only a portion of the visual work at a time. The camera support may then be moved by the carriage to at least one subsequent location that overlaps the first position to acquire another image. In particular implementations, the overlap may be about 50%. Once images covering the entire visual work have been acquired, the images may be stitched together to form a composite, detailed image.

In certain implementations, the imaging system may include a motor coupled to each side support and a motor coupled to the cross member. A controller may command the motors to place the carriage in a preselected location. In particular implementations, the controller is adapted to take commands from the smart camera on the carriage regarding locations for moving the carriage thereto.

Some implementations may include a server system adapted to communicate with the smart camera. The smart camera may be adapted to upload images of the visual work to the server system, and the server system may be adapted to stitch the images together into a single image.

In particular implementations, the server system is further adapted to determine locations to move the carriage to for imaging and to provide these locations to the smart camera. The smart camera may upload an image from each location to the server system for verification before moving to the next location.

Some implementations may include a calibration card having a plurality of colors. The calibration card may further include geometric shapes thereon, which the server system is adapted to analyze to determine the locations to move the carriage to for imaging.

The systems, processes, and techniques allow a detailed, well illuminated image of a visual work to be generated. When just a single image of a visual work is obtained using traditional techniques, many inconsistencies come into play (e.g., lighting, lens distortions, resolution color reference, etc.). The images developed by the disclosed systems, processes, and techniques should reduce the effects of one or more of these inconsistencies.

Many other features will be evident from the remainder of this application in light of a more exhaustive understanding of the numerous difficulties and challenges faced by the prior art, which in turn will be evident to those skilled in the art.

BRIEF DESCRIPTION OF THE DRAWINGS

For a more complete understanding of the present invention and its implementations, and the features thereof, reference is now made to the following descriptions taken in conjunction with the accompanying drawings, in which:

FIG. 1A is a line drawing illustrating an example imaging sequence in accordance with one embodiment of the present invention.

Like reference numerals are used for similar elements of various embodiments.

DETAILED DESCRIPTION

While the inventive concepts are much more basic than any particular implementation, one skilled in the art can gather a partial appreciation for some of the possible benefits of the broader concepts and possible interplay between various elements of the concepts in the course of considering example implementations, some of which are described in detail below.

The systems, processes, and techniques depicted herein allow for efficient and effective imaging of visual works, such as artworks (e.g., paintings, sketches, etchings, etc.) and written works (e.g., manuscripts, books, archives, etc.). In particular, the systems, processes, and techniques allow a series of detailed images to be taken of a visual work and then combined together to make a single, detailed image of the whole visual work.

Figure 1:
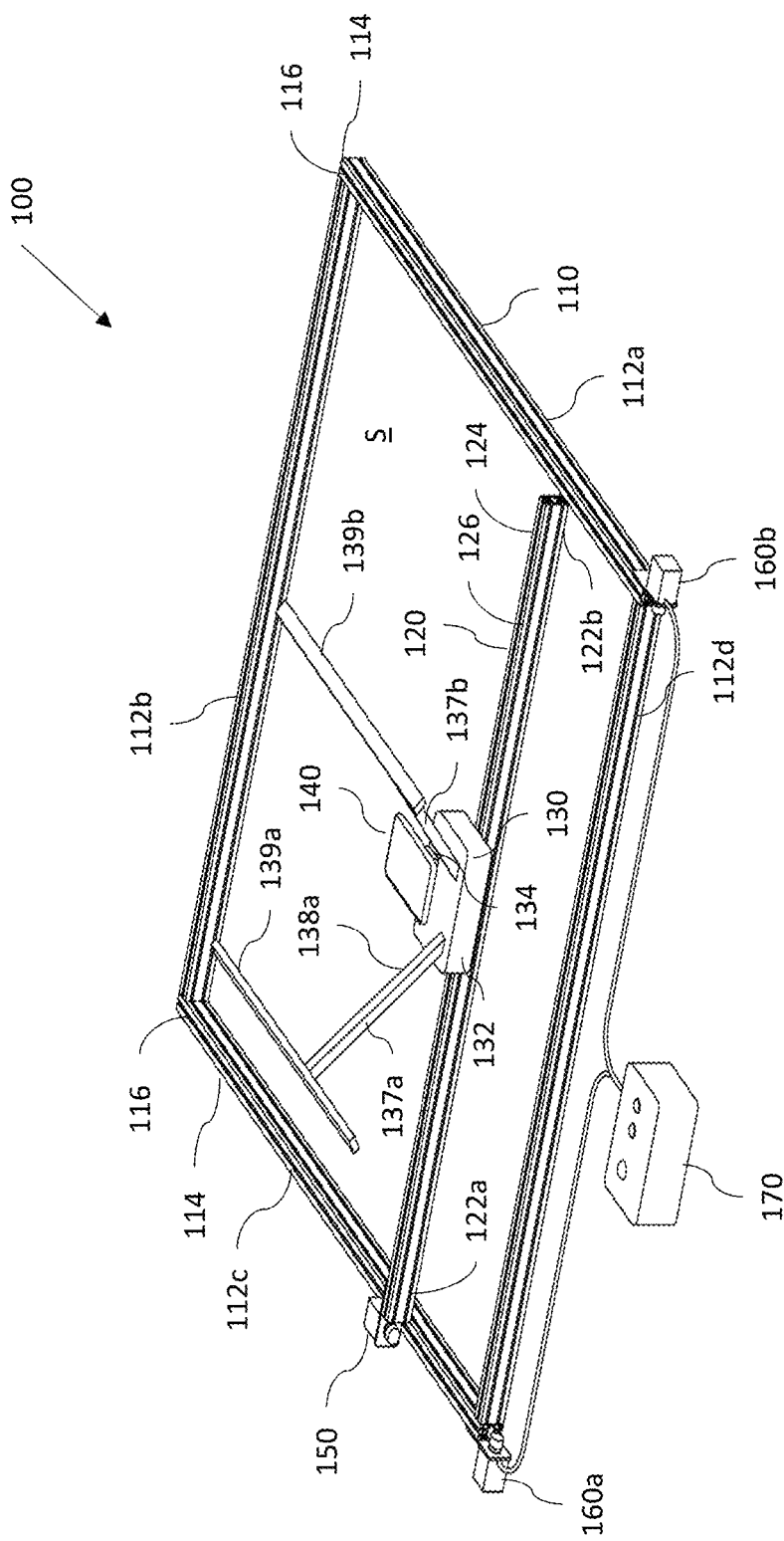
FIG. 1 is a line drawing illustrating selected components of a visual work imaging system in accordance with one embodiment of the present invention.

FIG. 1 illustrates selected components of an example system 100 for imaging an visual work. Among other things, imaging system 100 includes a frame 110, a cross member 120, and a carriage 130.

Frame 110 provides the basic support for imaging system 100. In the illustrated implementation, frame 110 includes four side supports 112, which are typically elongated members as shown. Together, side supports 112 form a space S in which the visual to be imaged may be placed. Side supports 112 are generally flat on their bottoms and provide the base support for imaging system 100. Side supports 112, for example, may engage a horizontal surface (e.g., a floor or a table), a vertical surface (e.g., a wall), or an inclined surface. In particular implementations, side supports 112 may have devices (e.g., anti-skid pads, suction cups, portions of hook and loop fastener systems, a hanger, etc.) applied thereto to assist in keeping side supports 112 stationary.

Each of side supports 112a, 112c includes a track 114. In the illustrated implementation, tracks 114 each include a conveyor 116 (e.g., a belt and pulley assembly) assembly. Tracks 114 provide a guide for cross member 120 to move along side supports 112a, 112c. As illustrated, tracks 114 are convex in shape (e.g., a rail), but they may be concave or other appropriate shape in other implementations.

Side supports 112 may be made of metal (e.g., steel or aluminum), composite, or any other appropriate material. In particular implementations, side supports 112 may be approximately three feet long. In other implementations, side supports 112 may be twenty feet long or longer. Side supports 112 may have multiple sections for longer configurations. Some implementations may use fewer than four side supports (e.g., two).

Cross member 120 is coupled to tracks 114 near its end 122. This coupling supports cross member 120 so that it spans the area S between side supports 112 and also defines its motion. That is, ends 122 of cross member 120 move along the longitudinal axes of side supports 112a, 112c, so cross member moves perpendicularly thereto. Cross member 120 may interface with tracks 114 by have a complimentary track (e.g., a concave or convex track) and/or have wheels that engage tracks 114. In certain implementations, cross member 120 may include locks (e.g., set screws) that secure ends 122 of cross member 120 to side supports 112 to prevent longitudinal motion along the axis thereof.

Cross member 120 also includes a track 124. Track 124 provides a guide for carriage 130 to move along cross member 120. As illustrated, track 124 is convex in shape (e.g., a rail), but it may be concave or other appropriate shape in other implementations. In the illustrated implementation, track 124 includes a conveyor assembly 123 (e.g.), a belt and pulley assembly to move carriage 130.

Carriage 130 includes a base member 132 and a mount 134. Base member 132 includes a member that interfaces with track 124 of cross member 120. In particular, the member may include a track to engage track 124 of cross member 120. The track may, for example, be a concave channel that engages track 124. In other implementations, the member may include a convex channel to engage track 124. By engaging track 124, the member confines the carriage 130 to move along the longitudinal axis cross member 120.

Attached to base member 132 is mount 134, which supports a smart camera 140 above the visual work to be imaged. Mount 134 may receive and secure the smart camera by any appropriate technique (e.g., clips, friction fit, set screws, etc.). In particular implementations, mount 134 may support the smart camera about 6-8 inches away from the visual work to be imaged. In certain implementations, mount 134 may be adjustable in height and/or angle relative to base member 132. Mount 134 secures a camera 140 to imaging system 100. In particular implementations, mount 134 may allow a smart phone (e.g., an iPhone or an Android phone) or a digital camera (e.g., a single-lens reflex camera) to be mounted thereto.

Coupled to carriage 130 are light stands 137. Each of light stands 136 includes a support 138 and a light 139. Supports 138 position lights 139 above and to the side of carriage 130. In particular implementations, the height and angle of supports 138 may be adjustable relative to base member 132. Lights 139 may, for example, be incandescent bulbs, fluorescent bulbs, or light-emitting diodes. In particular implementations, each of lights 139 may be an LED light bar with a color rendering index of greater than 90 (correlated color temperature of about 4000° K). Lights 139 may be rotatable relative to light stands 138 to appropriately focus the light therefrom. In particular implementations, light stands 138 may be oriented at approximately a 45 degree angle relative to the surface of the visual work being imaged.

Coupled to end 122a of cross member 120 is a motor 150. Motor 150 is responsible for actuating conveyor 126 to move carriage 130 over the visual work to be imaged. Motor 150 may, for example, be an electrically-powered stepper motor. Motor 150 may move conveyor 126, and hence carriage 130, in fine increments (e.g., between 1 mm to 1 cm). In particular implementations, motor 150 may move conveyor 126 in increments of about 5 mm.

Coupled to an end of each support member 112a, 112c are motors 160. Motors 160 are responsible for actuating conveyors 116 to move cross member 120 over the visual work to be imaged. Motors 160 may, for example, be electrically-powered stepper motors. Motors 160 may move conveyors 116, and hence cross member 120, in fine increments (e.g., between 1 mm to 1 cm). In particular implementations, motors 160 may move conveyors 116 in increments of about 5 mm.

Coupled to motors 150, 160 is a controller 170. Controller 170 is responsible for commanding motors 150, 160 to move the associated conveyors to the appropriate position. Controller 170 may, for example, use analog or digital signaling to command motors 150, 160 Controller 170 is able to establish a wireless connection with smart camera 140 so that the controller may be controlled thereby. Controller 170 may, for example, include a microcontroller to perform logical operations.

In particular modes of operation, side supports 112 are positioned on the outside of the visual work to be imaged (or the visual work is positioned inside the side supports), and cross member 120 is spanned across the visual work. Side support 112a or side support 112c may, for example, be positioned near or on the side of the artwork, and side support 112b may be near or on the bottom of the visual work. An image $I_1$ of a portion of the art work may then be taken (e.g., at the upper right of the visual work) as shown in FIG. 1A. In certain modes of operation, the visual work may be positioned at a corner of the frame 100 and imaging may begin from there. In other modes of operation, the carriage may be positioned at a corner of the visual work and imaging may commence from there.

Next, controller 170 may receive a command from smart camera 140 to move carriage 130 to a new position (to the left), as illustrated in FIG. 1A. The controller may then issue commands to motors 160 (typically the system works across and then down) and confirm that the carriage is at the correct location. The controller may then inform the smart camera that the appropriate position has been achieved, and the smart camera may take the next image, which will overlap with the first image (e.g., between 25%-75%). The carriage may be sequentially moved to a number of positions at which the smart camera acquires overlapping images of the visual work until the entire visual work is imaged.

The images of the visual work may then be processed to create a single, high-resolution image of the visual work. This image processing may take place locally at the imaging system 100 (e.g., via a computer communicatively coupled to the smart camera) or remotely (e.g., at a server system communicatively coupled to the smart camera).

In particular implementations, creating a single, high-resolution image may be performed by image stitching the individual images together. Stitching the images together may, for example, include image registration, image calibration, and image blending.

Image registration may involve matching features in a set of images or using direct alignment methods to search for image alignments that minimize the sum of absolute differences between overlapping pixels. When using direct alignment methods, the image may first be calibrated to achieve improved results. To estimate a robust model from the data, a method such as Random Sample Consensus (RANSAC) may be used. RANSAC is an iterative method for robust parameter estimation to fit mathematical models from sets of observed data points that may contain outliers. The algorithm is non-deterministic in the sense that it produces a reasonable result only with a certain probability, with this probability increasing as more iterations are performed.

Image calibration aims to minimize differences between an ideal lens model and the camera-lens combination that was used, optical defects such as distortions, exposure differences between images, vignetting, camera response, and chromatic aberrations. If feature detection methods were used to register images and absolute positions of the features were recorded and saved, image integration software may use the data for geometric optimization of the images in addition to placing the images.

Image blending involves executing the adjustments determined in a calibration stage, combined with remapping of the images to an output. Colors are adjusted between images to compensate for exposure differences. If applicable, high dynamic range merging may be performed along with deghosting. Images are blended together and seam line adjustment is performed to minimize the visibility of seams between images.

The seam can be reduced by a simple gain adjustment. This compensation is basically minimizing intensity difference of overlapping pixels. Image blending typically allots more weight to pixels near the center of the image. Gain compensated and multi-band blended images typically compare the best. Straightening is another method to rectify the image.

Even after gain compensation, some image edges may still be visible due to a number of unmodelled effects, such as vignetting (intensity decreases towards the edge of the image), parallax effects due to unwanted motion of the optical center, mis-registration errors due to mismodelling of the camera, radial distortion, and so on. Due to these reasons, a multi-band blending may be used in some implementations.

Although FIG. 1 illustrates one embodiment of an visual work imaging system, other systems may include fewer, greater, and/or a different arrangement of components. For example, a system may not include side supports 112b, 112d. As another example, a system may include a remote computer system (e.g., a server system) that assists the smart camera in imaging the visual work and/or stitching the image. In particular implementations, side supports 120 and/or cross member 130 may have demarcations thereon to aid in the accurate placement of carriage 130 between images.

Smart camera 140 may contain a file management system for storing images. The images may be stored on the smart camera itself and/or remotely (e.g., on cloud-based storage). Storing the images in two locations allows the images to be retrieved from multiple locations and provides for redundancy. The file management system may also store the images securely (e.g., requiring two factor authentication).

Although the visual work has been discussed as having corners (e.g., it is rectangular in shape), the system may function with visual work that does not have corners (e.g., circular or elliptical). For example, by starting the carriage at an outer corner of a rectangle that circumscribes the visual work, a complete image of the visual work may be obtained.

Figure 2:
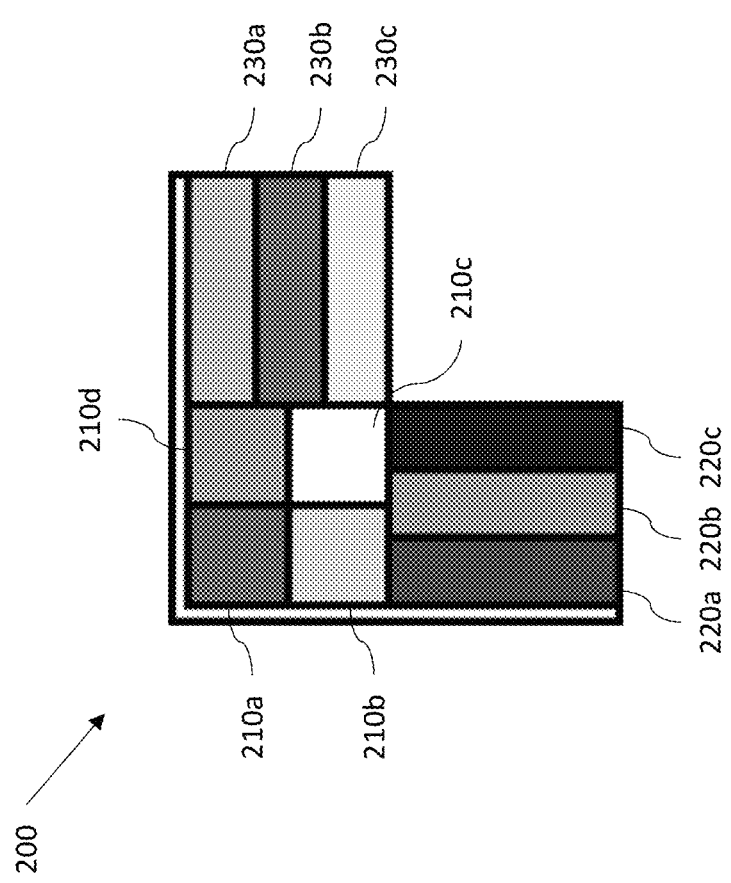
FIG. 2 is a line drawing illustrating an example calibration card for use with a visual work imaging system in accordance with one embodiment of the present invention.

FIG. 2 illustrates an example calibration card 200 that may be used for particular implementations. As illustrated, calibration card contains many boxes that have different colors associated with them. For example, boxes 210 have different gray scale levels. Boxes 220 have different colors for an additive color model (e.g., red, green, and blue, respectively), and boxes have different colors for a subtractive color model (cyan, magenta, and yellow, respectively).

By taking an image of calibration card 200 before, during, and/or after an imaging process, as illustrated in FIG. 1A, an accurate reproduction of the contrast and colors of the visual work may be obtained, especially when presenting the visual work on computer screens or prints.

The calibration card may also be used to determine how to move a carriage during the imaging process. For example, by analyzing the distance between the lines of the boxes, the distance of the smart camera from the visual work may be determined. Using this, the amount to move the carriage between imaging each segment (e.g., to achieve the appropriate overlap) may be determined.

In particular implementations, the imaging process may begin with placing the calibration card next to a corner of the image or a circumscribing rectangle of the image. The carriage may then be positioned so that the calibration card may be imaged. As noted above, this provides a reference for the colors obtained during imaging and may provide information regarding how to move the carriage. Moreover, this may define where to begin the imaging process.

Certain implementations may include an articulating holder for the calibration card. The holder may be activated by the user to place the card at a side of the visual work and level with the upper surface thereof.

Figure 3:
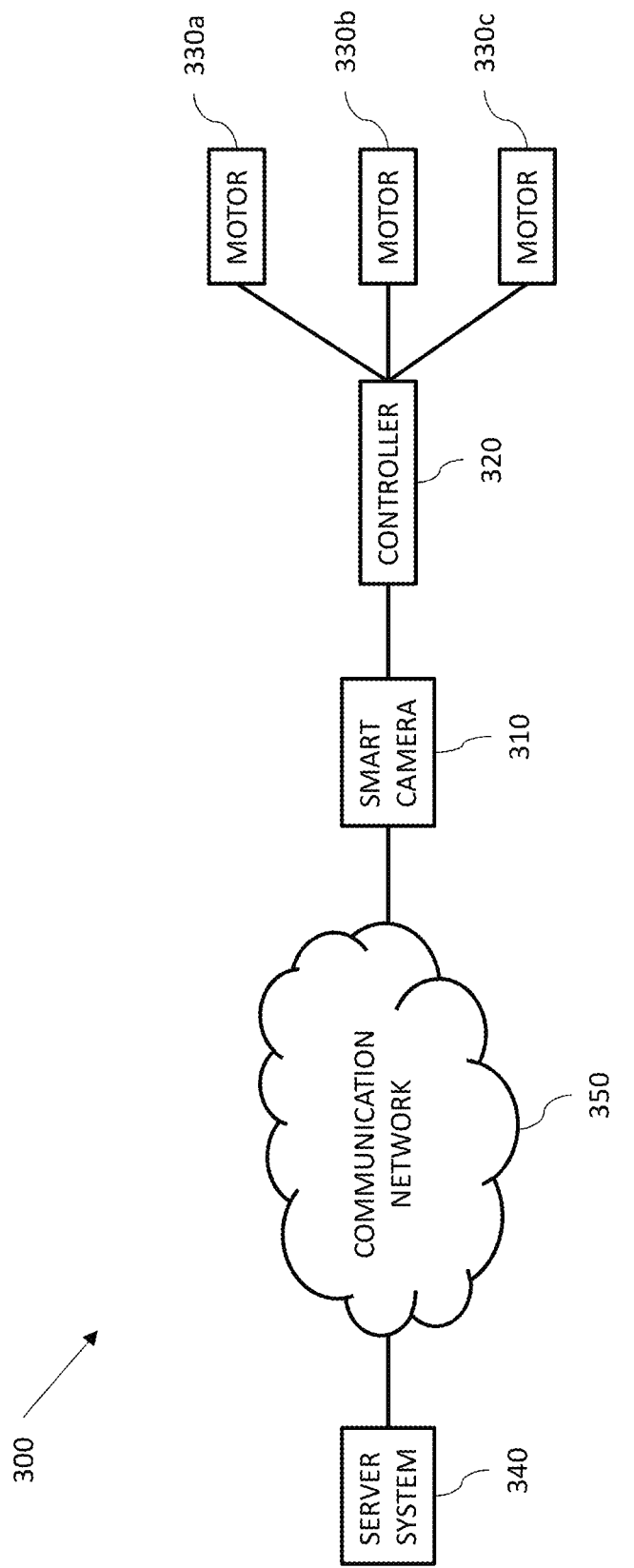
FIG. 3 is a block diagram illustrating selected components of visual work imaging system in accordance with one embodiment of the present invention.

FIG. 3 illustrates an example control system 300 for imaging visual work. System 300 may, for example be used with system 100. System 300 includes a smart camera 310, a controller 320, motors 330, and a server system 340.

Smart camera 310 (e.g., a smart phone) is adapted to sequentially obtain images of a visual work to be imaged. To accomplish this, smart camera 310 may interact with controller 320 to move the smart camera, which may be mounted on a carriage, to the correct location for each image. Controller 320 may then command motors 330, which may move the smart camera (e.g., in X-Y coordinates) to the correct location.

Server system 340 is adapted to provide overall control of the image acquisition process and the image stitching process. Server system 340 may, for example, be a single server or a group of servers (whether co-located or distributed).

Server system 340 is coupled to smart camera 310 through a communication network 350. Communication network 350 may include one or more wireline (e.g., local area network or wide area network) links and/or one or more wireless (e.g., cellular) links. In particular implantations, communication network 350 may include the Internet.

In certain modes of operation, the imaging process begins when a user manually places the visual work to be imaged within a frame and places the smart camera in the mount of the carriage.

An application is then initiated on smart camera 310. The application causes the smart camera to connect wirelessly (e.g. via Bluetooth) to controller 320 and establish a connection (e.g., a WebSocket) to server system 340 through communication network 350. In certain implementations, the user may select if he wants to use a connection (e.g., a USB cable) to power the smart camera while in the carriage. The user may then position any attached, flexible lighting fixtures to optimize visibility.

The user then presses an initiation button on controller 320. The controller sends a message to the smart camera, which notifies server system 340 that the local system is ready for imaging. Server system 340 then returns job instructions detailing how to perform the imaging process to the application on smart camera 310. The smart camera parses the job's instructions and begins the stitch job.

To begin the actual imaging process, the smart camera requests that controller 320 move the smart camera to coordinates X, Y on the rail guided system using motors 330. At those coordinates, the application instructs smart camera 310 to image a calibration card, an example of which is seen in FIG. 2. This data is then transformed (e.g., into base64 data), and sent to server system 340 for processing.

Server system 340 processes the image of the calibration card and sends further instructions to smart camera 310. The instructions may, for example, specify how to position the smart camera while acquiring an image.

Based on the further instructions, the application can begin the rest of the imaging process. Now, smart camera 310 requests that controller 320 move the carriage to the starting point of the imaging process.

Once the controller confirms that the carriage is at the appropriate location, smart camera 310 captures an image. This image is a segment of the stitch job. The segment is temporarily stored on the smart camera and then uploaded to the server system for processing. The server system processes and saves the processed segment into long term storage (e.g., in Google Cloud Storage).

Once server system 340 is satisfied with the processed segment, the server system will repeat the process for each of the segments necessary to complete the stitch job, as illustrated by FIG. 1A. That is, the server system will repeatedly issue instruction to the smart camera, the smart camera will command the carriage to move to a new location and obtain an image, the controller will move the carriage to the new location and notify the smart camera, and the camera will acquire the image and upload it to the server system.

Once the server system recognizes that all segments necessary to complete the stitch job have been captured, the server system may process the segments to create a composite image or initiate a stitch processing request containing the information necessary to tie the segments together. The server system may begin executing the stitch processing request by creating a stitching virtual machine (e.g., on Google Cloud Compute Engine) that has metadata corresponding to the stitch processing request embedded inside of it, as well as an NVIDIA Tesla K80 Graphics Processing Unit attached to it.

The stitching virtual machine is responsible for performing the computations necessary for stitching. In particular, once the stitching virtual machine has booted up, the stitching virtual machine will use the metadata embedded into its configuration by the stitch processing service to execute a series of steps. First, the pertinent segments from long term storage may be downloaded to the local disk for rapid processing. Then, the pertinent stitch processing request data may be downloaded to the local disk for future use. Next, a series of commands and software may be executed that will leverage the specialized graphics processing unit in parallel with the processors of the stitching virtual machine to blend the segments together into a stitched Image. The stitched image may then be uploaded to long term storage, and the server system may be notified of the completion of the stitch processing request. The stitching virtual machine be terminated one completion is confirmed. The server system will then notify the user that the stitch job is complete and present the user with a view of the stitch (e.g., on the smart camera).

Figure 4:
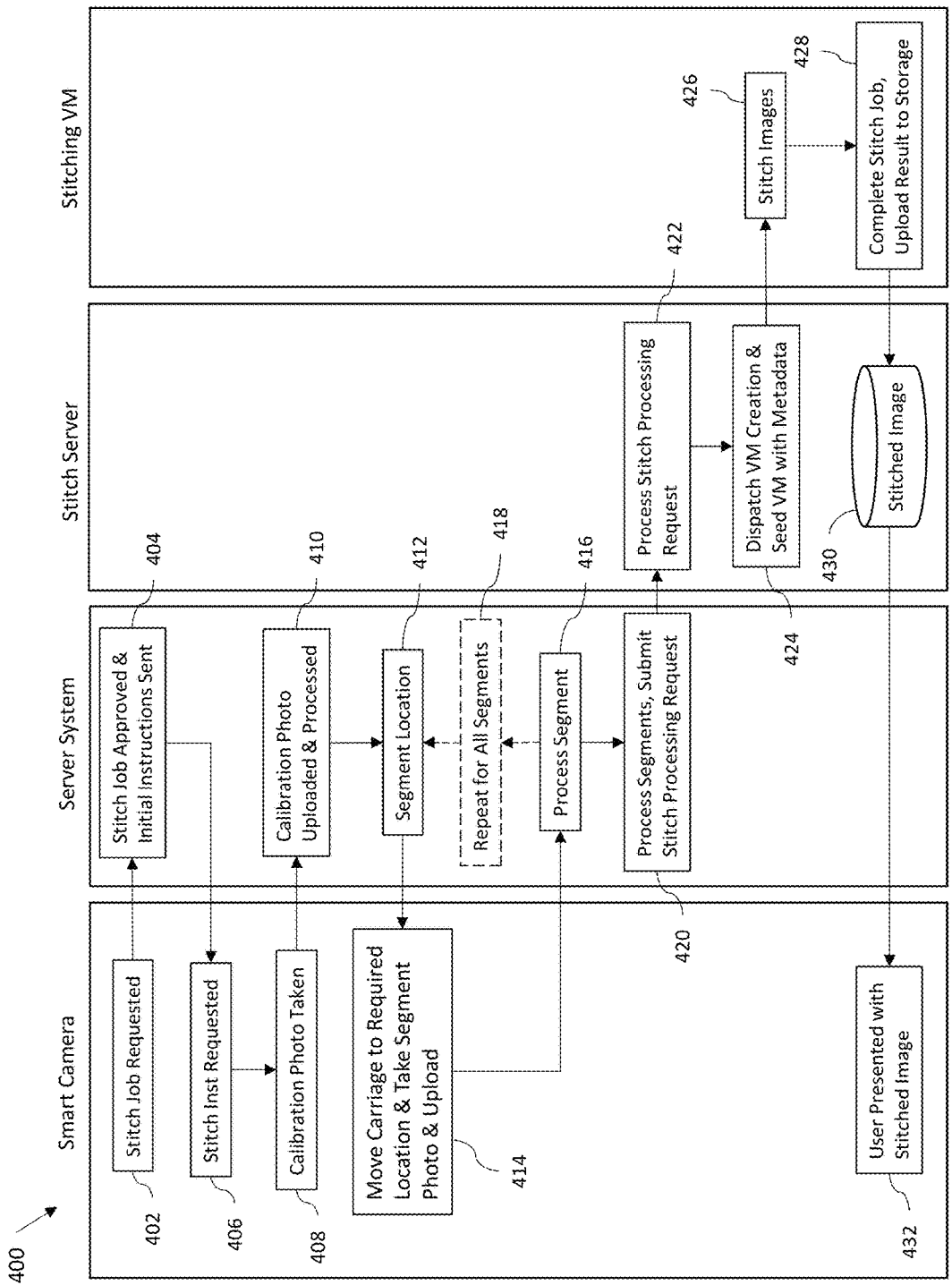
FIG. 4 is a flowchart illustrating an example process for an imaging a visual work in accordance with one embodiment of the present invention.

FIG. 4 illustrates an example process 400 for a visual work imaging system in accordance with one embodiment of the present invention. Process 400 may, for example, be used with a system like system 300.

Before process 400 begins, a user places the visual work to be imaged within the frame, inserts the smart camera into the camera mount, and starts the application on the smart camera. An empty panorama is added to the user's album to be used for the stitch. The smart camera then wirelessly connects to the controller for the rail guided system (e.g., via Bluetooth) and establishes a connection (e.g., via a Web socket) to the server system, which may be cloud based.

The user may also choose if he wants to power the smart camera via the carriage. Additionally, the user may position the attached, flexible light fixtures to optimize visibility. In some implementations, the user may also place a calibration card near the visual work. The user then presses an initiation button on the controller.

Upon activation of the initiation button, the smart camera sends a stitch job request to the server system (operation 402). The server returns job instructions detailing how to perform the imaging for stitch to the smart camera (operation 404).

The smart camera parses details of job instructions and begins the stitch imaging (operation 406). As part of this, the smart camera requests that the controller move the carriage system to coordinates (e.g., X, Y), on the rail guided system. The controller may accomplish this via motors built into the rail guided system. Once the smart camera receives confirmation that the carriage is at the appropriate spot, the smart camera takes a picture of the calibration card (operation 408). This data is then sent, perhaps after a transformation, to the server system, which processes the image of the calibration card (operation 410). The server system also determines the segment locations for the visual work being imaged (operation 412) and sends these to the smart camera.

Using the instructions from the server system, the smart camera can begin the rest of the imaging job. In particular, the smart camera requests that the controller move the carriage to the starting point of the stitch job, waits for confirmation from the controller, takes an image, which is a segment of the stitch job, and uploads the image to the server system (operation 414). The server system processes and saves the segment into long term storage (e.g., into Google Cloud Storage) (operation 416). Once server system is satisfied with the processed segment, the server system will repeat the process for each of the segments necessary to complete the stitch job (operation 418).

Once the server system recognizes that all segments necessary to complete the stitch job have been captured, the server system will process the segments and submit a stitch processing request to a cloud-based stitch processing server system (operation 420). Processing the segments may, for example, include determining whether all the metadata (e.g., Exchangeable image file format (Exif) data) is present. An example stitch processing request in JSON is shown below:

```
{
  "job_id": 6,
  "segments": ["AxsGcRpR3V5Sd1QCFAXp2unM",
    "JGPd9YDFhafiEozUTQ9DNPKn",
    "bn1ZsKrzBtq2ZXFmtjfdK3Qw", "yfbNfZMnw9E9
    gyejP7uuUhb4", "xvgq1tiPuwRonE5gkg4xiKLw"],
  "placeholder": "Y66RhiaF8CLpZV3boTXBw6Hr",
  "csv": "nggnSz839AUdvnyFQFsYezKi"
}
```

The stitch processing server system contains the information necessary to tie the segments together. The stitch processing server system will first analyze the request to make sure it is complete (operation 420) and then begin executing the stitch processing request by creating a stitching virtual machine (operation 424). The stitching virtual machine may, for example, reside on Google Cloud Compute Engine and contain metadata corresponding to the stitch processing request embedded inside of it, as well as an NVIDIA Tesla K80 Graphics Processing Unit attached to it.

The stitching virtual machine is responsible for performing the computations necessary for stitching (operation 426). For example, once the stitching virtual machine is booted up, the stitching virtual machine may use the metadata embedded into its configuration by the stitch processing server system to: 1) download the pertinent segments from long term storage to a local disk for rapid processing; 2) download the pertinent stitch processing request data from long term storage to a local disk for future use; and 3) execute a series of commands and software that will leverage the specialized graphics processing unit in parallel with the processors of the stitching virtual machine to blend the segments together into a stitched image. Examples instructions for booting a server system and running control software are:

'match-n-shift --input input.csv -o project.pto'

'pto_var --opt=TrX,TrY projecLpto -o project.pto'

'cpfind -v -o project.pto --fullscale --prealigned project.pto'

'cpclean -o project.pto'

'autooptimiser -n -o project.pto'

'pano_modify -p 0 --fov=AUTO --crop=AUTO --canvas=AUTO -o project.pto'

'nona --gpu -v -m TIFF_m --seam=blend project.pto -o stitch_section'

'enblend --gpu -v --primary-seam-generator=graph-cut -o file.tiff./stitch_section00*'

In particular implementations, a substantial overlap between segment (e.g., 50%) may allow the insertion of pixels that do not exist in the actual images.

Once the stitch job is complete, the virtual stitching machine may upload the stitched image to long term storage and notify the stitching server system of completion of the stitch processing request (operation 428). The stitching virtual machine may also terminate the stitching virtual machine from within once completion is confirmed. The stitching server system may will notify the user that the stitch job is complete and send the user a view of the stitched image (operation 430). The user may view the stitched image on the smart camera (operation 432).

Process 400 process a variety of features. For example, process 400 allows an on-demand stitching of mosaics to be performed. Thus, dedicated resources for performing a stitch, which are very specialized, are available on an as needed basis.

Although FIG. 4 illustrates one implementation of a process for imaging a visual work, other process for imaging an visual work may include fewer, greater, and/or a different combination of operations. For example, a process may not include using cloud-based stitching operations. For instance, the stitching may be performed on a dedicated server system. As another example, a process may be performed locally.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server system. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

Figure 5:
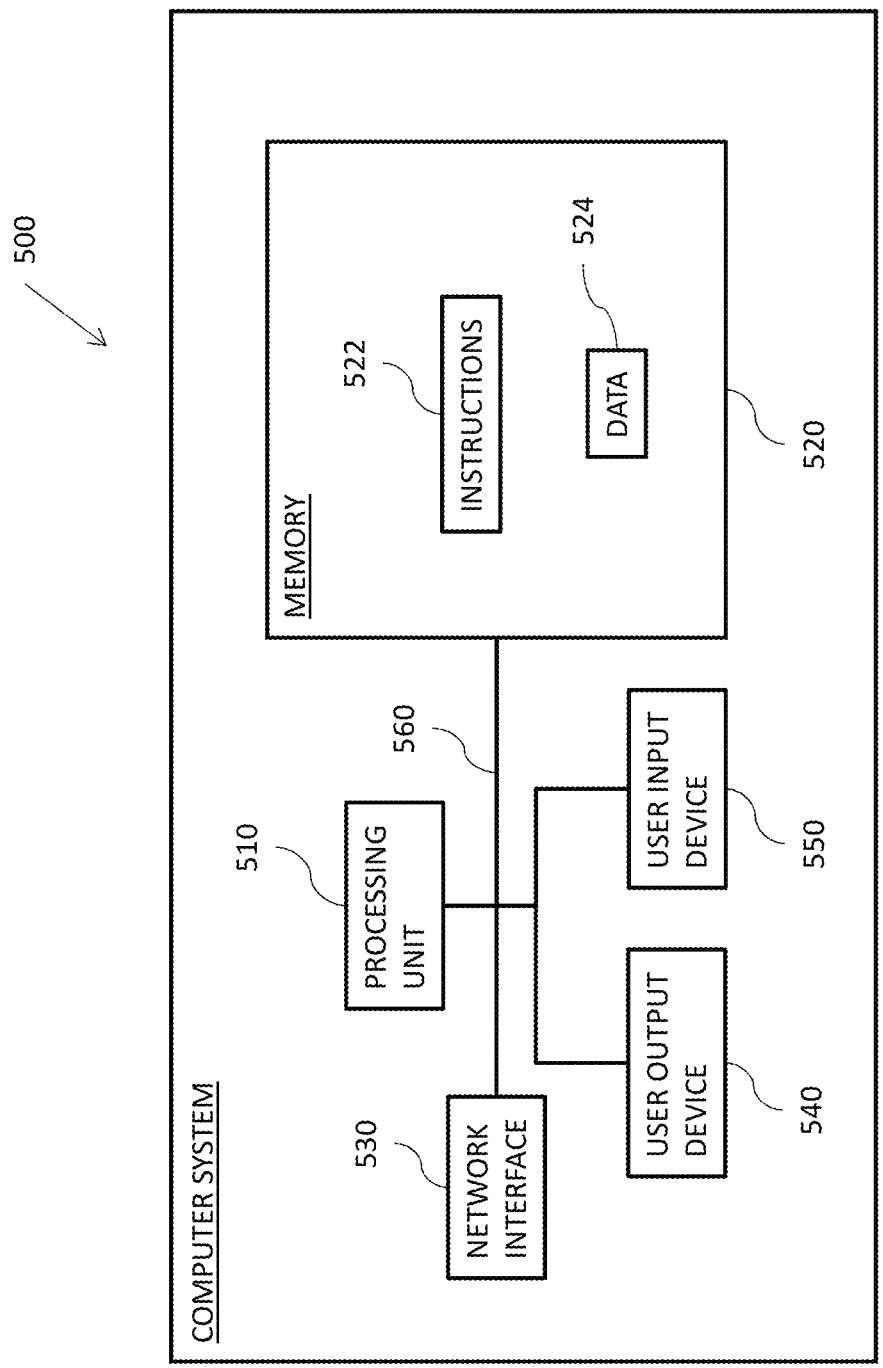
FIG. 5 is a block diagram illustrating an example computer system for use in a visual work imaging system.

FIG. 5 illustrates selected components of an example computer system 500 for performing visual work imaging. System 500 may, for example, be part of a local computer system (e.g., a smart camera) or part of a remote computer system (e.g., a server system). Among other things, computer system 500 includes a processing unit 510 and memory 520, which are coupled together by a network system 560.

Processing unit 510 may, for example, include one or more processors (e.g., microprocessors, microcontrollers, field-programmable gate arrays, or application specific integrated circuits). The processors could, for instance, operate according to reduced instruction set computer (RISC) or complex instruction set computer (CISC) principles. Processing unit 510 may operate according to instructions stored in memory 520 and/or encoded on processing unit 510 itself. In general, processing unit 510 may include any number of devices that can manipulate information in a logical manner.

Memory 520 may, for example, include random access memory (RAM), read-only memory (ROM), and/or disc memory. Various items may be stored in different portions of the memory at various times. Memory 530, in general, may be any combination of devices for storing information.

Memory 520 includes instructions 522 and data 524. Instructions 522 may include an operating system (e.g., Windows, Linux, or Unix) and one or more applications. In certain implementations, applications could include an image capture application, a camera application, and/or a stitching application. Data 524 may include a single image segment, a number of image segments, or the stitched image.

Network interface 530 may include one or more communication interfaces. A communication interface may, for instance, be a network interface card (whether wireline or wireless) or a modem (whether wireline or wireless). The communication interface may allow data exchange with a data network (e.g., the Internet or an Ethernet) or a phone network (e.g., a cellular network).

System 500 also includes a user output device 540 and a user input device 550. User output device 540 could, for example, be a display, a speaker, or an screen (e.g., a an LCD display). User input device 550 could, for example, be a keyboard, a keypad, a touchpad, a stylus, a mouse, or a microphone.

Network system 560 is responsible for communicating information between processing unit 510, memory 520, network interface 530, user output device 540, and user input device 550. Network system 560 may, for example, include a number of different types of busses (e.g., serial and parallel).

In certain modes of operation, computer system 500, according to instructions 522, may receive commands regarding where to position a carriage that supports a camera. The processor may then instruct a controller regarding where to position the carriage. Once the computer system 500 receives acknowledgement of the carriage's position, the processor may command the camera, which may be part of the same device as the computer system, to obtain an image. The image may then be uploaded to a remote server system. The processor may then command the carriage to move to the next location at which an image is to be obtained. This cycle may be repeated continually until all of the images of an visual work are obtained. Processor 510 may implement any of the other procedures discussed herein, to accomplish these operations.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for visual work imaging, and several others have been mentioned or suggested. Moreover, those skilled in the art will readily recognize that a variety of additions, deletions, modifications, and substitutions may be made to these implementations while still achieving visual work imaging. Thus, the scope of the protected subject matter should be judged based on the following claims, which may capture one or more concepts of one or more implementations.

The invention claimed is:

1. A visual work imaging system, comprising:
   a first and a second side support configured to engage a support surface and support the imaging system thereon, the first and second side supports including tracks along their longitudinal axes;
   a cross member configured to span between the first and second side supports and engage the tracks of the side supports to move along their longitudinal axes, the cross member including a track along its longitudinal axis; and
   a carriage adapted to move along the track of the cross member, the carriage including a camera mount configured to receive, secure, and position a camera above the visual work to be imaged so that the camera images only a portion of the visual work at a time, wherein the carriage is moved to successive image acquisition locations at which an acquired image partially overlaps with the previous image.

2. The imaging system of claim 1, further including at least two light stands coupled to the carriage, the light stands located on opposite sides of the carriage.

3. The imaging system of claim 2, wherein the light stands are adjustable in angle relative to the carriage.

4. The imaging system of claim 1, wherein the cross member includes locking mechanisms to lock the cross member in position relative to the first and second side supports.

5. The imaging system of claim 1, wherein the carriage includes locking mechanisms to lock the carriage in position relative to cross member.

6. The imaging system of claim 1, wherein the carriage includes locking mechanisms to lock a camera in position relative to the carriage.

7. The imaging system of claim 1, wherein the first and second side supports include mechanisms configured to secure the side supports to a support surface.

8. The imaging system of claim 1, further comprising:
   a motor coupled to each side support;
   a motor coupled to the cross member; and
   a controller coupled to each motor, the controller adapted to command the motors to place the carriage in a preselected location.

9. The imaging system of claim 8, wherein the controller is adapted to receive commands from a smart camera regarding locations for moving the carriage thereto.

10. The imaging system of claim 9, further comprising a server system communicating with the smart camera, the smart camera adapted to upload images of the visual work to the server system, the server system adapted to stitch the images together into a single image.

11. The imaging system of claim 10, wherein the server system is further adapted to determine that all images of the visual work have been acquired and stitch the images together into a composite image.

12. The imaging system of claim 10, wherein the server system is further adapted to determine locations to move the carriage to for imaging and to provide these locations to the smart camera.

13. The imaging system of claim 12, further comprising a calibration card comprising a plurality of colors.

14. The imaging system of claim 13, wherein the calibration card further includes geometric shapes thereon, and the server system is adapted to analyze the geometric shapes to determine the locations to move the carriage to for imaging.

15. The imaging system of claim 1, wherein the imaging system is configured such that the surface of the visual work is not physically contacted by the system during imaging.

16. The imaging system of claim 1, wherein the side supports are spaced apart such that the work to be imaged is positioned entirely between the tracks.

* * * * *